United States Patent [19]

Teraoka et al.

[11] Patent Number: 4,723,623
[45] Date of Patent: Feb. 9, 1988

[54] FOUR WHEEL DRIVE VEHICLE

[75] Inventors: Akira Teraoka; Takashi Katayama; Katsumi Yanagihara, all of Osaka, Japan

[73] Assignee: Kubota, Ltd., Osaka, Japan

[21] Appl. No.: 33,766

[22] Filed: Apr. 3, 1987

[30] Foreign Application Priority Data

| Oct. 1, 1986 | [JP] | Japan | 61-235405 |
| Oct. 6, 1986 | [JP] | Japan | 61-238545 |
| Dec. 1, 1986 | [JP] | Japan | 61-287382 |
| Dec. 2, 1986 | [JP] | Japan | 61-288380 |

[51] Int. Cl.⁴ ............................................ B60K 17/34
[52] U.S. Cl. .................... 180/233; 180/75.1; 180/900
[58] Field of Search ............... 180/233, 242, 247, 248, 180/249, 250, 900, 75.1

[56] References Cited

U.S. PATENT DOCUMENTS 4,453,617  6/1984  Wu ........................ 180/247
4,574,910  3/1986  Miki ....................... 180/249

Primary Examiner—John A. Pekar
Attorney, Agent, or Firm—Cushman, Darby & Cushman

[57] ABSTRACT

A four wheel drive vehicle comprising dirigible front wheels supported by an front axle case, a propelling drive transmission disposed in a rear portion of the vehicle, rear wheels receiving a drive from the propelling drive transmission, and a front wheel drive transmission mounted in the front axle case and receiving a drive divided out from the propelling drie transmission. The front wheel drive transmission is switchable between a standard drive mode in which an average peripheral speed of the front wheels is substantially the same as an average peripheral speed of the rear wheels, and an accelerating mode in which the average peripheral speed of the front wheels is greater than the average peripheral speed of the rear wheels. The front axle case is supported by the vehicle to be pivotable on a pivotal axis disposed at a mid-position transversely of the vehicle and extending longitudinally of the vehicle.

9 Claims, 11 Drawing Figures

FOUR WHEEL DRIVE VEHICLE

BACKGROUND OF THE INVENTION

(1) Field of the Invention

The present invention relates to a four wheel drive vehicle, and more particularly to a four wheel drive agricultural tractor comprising a pair of dirigible front wheels supported by front wheel support means, a propelling drive transmission disposed in a rear portion of the tractor, a pair of rear wheels receiving a drive from the propelling drive transmission, and a front wheel drive transmission receiving a drive divided out from the propelling drive transmission. The front wheel drive transmission is switchable between a first four wheel drive mode or a position for standard drive transmission in which an average peripheral speed of the pair of front wheels is substantially the same as an average peripheral speed of the pair of rear wheels, and a second four wheel drive mode or a position for acceleration in which the average peripheral speed of the pair of front wheels is greater than the average peripheral speed of the pair of rear wheels.

(2) Description of the Prior Art

In the agricultural tractor as described above, the front wheel drive transmission is switched to the accelerating position for accelerating the front wheels in response to a front wheel steering operation. Thus the tractor is pulled round by the front wheels when making a turn. This construction permits the tractor to make a smaller turn than the case of maintaining the front wheels at an average peripheral speed equal to an average peripheral speed of the rear wheels.

A known agricultural tractor of this type is disclosed, for example, in U.S. Pat. No. 4,574,910 in which a front wheel drive transmission is incorporated into a propelling drive transmission disposed in a rear portion of the tractor. The agricultural tractor often carries a rotary plow or other working implement connected to the rear end thereof. However, because of the weight of the working implement acting on the rear end of the tractor, a weight acting on the front wheels is smaller than when the working implement is not connected. It is necessary to provide a balancing weight in a front portion of the tractor in order that the front wheel acceleration be effective for the tractor to make a small turn. The balancing weight so provided must be very heavy since in the known construction the front wheel drive transmission imparts its weight to a greater degree to the rear wheels than to the front wheels.

SUMMARY OF THE INVENTION

The object of the present invention is to provide a four wheel drive vehicle having an optimal weight distribution to the front and rear wheels without requiring a large balancing weight, thereby to be capable of making good small turns by front wheel acceleration.

In order to achieve this object, a four wheel vehicle according to the present invention has a construction as described at the introductory part hereof, with the front wheel drive transmission being mounted in the front wheel support means.

Because of the position of the front wheel support means, the above construction permits a greater part of the weight of the front wheel drive transmission to fall on the front wheels.

It may still be necessary to provide a balancing weight in a front portion of the vehicle so that the front wheel acceleration produce a satisfactory vehicle turning effect. Even so, a balancing weight lighter than in the prior art will serve the purpose since a greater part of the weight of the front wheel drive transmission falls on the front wheels. The light balancing weight may readily be attached to and detached from the tractor when the working implement is connected to and disconnected from the tractor.

In a four wheel vehicle according to one preferred embodiment of the invention, the front axle support means comprises a front axle case supported by the vehicle to be pivotable on a pivotal axis extending longitudinally of the vehicle. The front axle case houses front axle means extending transversely of the vehicle and including a front differential, and a transmission shaft extending longitudinally of the vehicle for transmitting the drive from the propelling drive transmission to the front differential. The front wheel drive transmission is mounted on the front axle means between the transmission shaft and the front differential. The pivotal axis is disposed such that the front wheel drive transmission is at one lateral side of the pivotal axis and the transmission shaft at the other lateral side of the pivotal axis.

According to the above construction the weight of transmission elements housed in the front wheel support means is appropriately distributed to the right and left wheels whereby the right and left front wheels have substantially the same ground engaging load without necessitating an undesirable balancing weight. This construction equalizes the propelling action of the right and left front wheels to assure safe running. It has a further advantage in that the tractor is lighter than when a balancing weight is employed.

Other objects and advantages of the present invention will be apparent from the following description of the preferred embodiments referring to the accompanying drawings.

DESCRIPTION OF THE PREFERRED EMBODIMENTS

Figure 1:
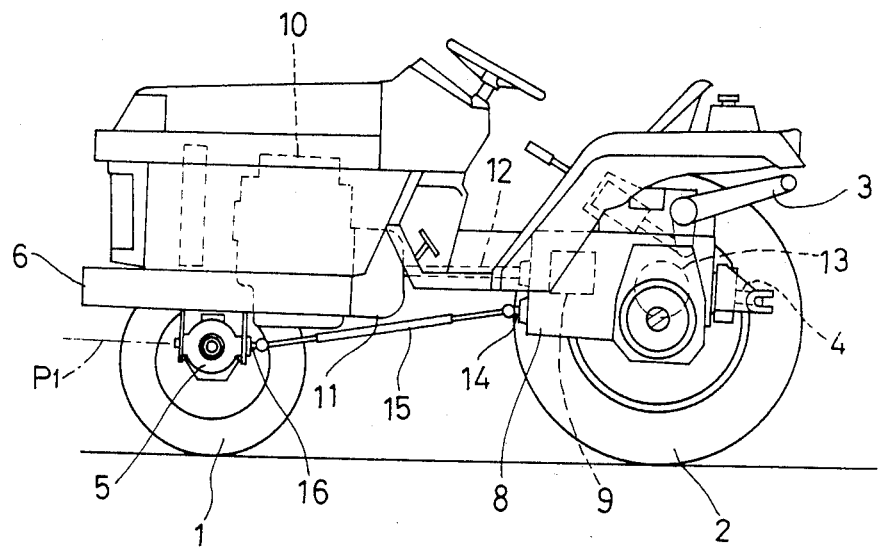
FIG. 1 is a side elevation, partly broken away, of a four wheel drive tractor embodying the present invention.

Referring to FIG. 1, an agricultural tractor shown therein comprises a chassis having dirigible right and left front wheels 1 and non-dirigible right and left rear wheels 2, both the front and rear wheels being drive wheels. The chassis includes, at a rear end thereof, a lift arm 3 for connection to and raising and lowering a working implement such as a rotary plow, and a power takeoff shaft 4 for driving the working implement.

The right and left front wheels 1 are attached to opposite ends of a front axle case 5 extending transversely of the tractor and acting as front wheel support means. The front axle case 5 is connected to a chassis frame 6 to be pivotable on a pivot axis P1 disposed at a mid-point transversely and extending longitudinally of the tractor. Because of this construction the right and left front wheels 1 make seesaw movements with the front axle case 5 pivoting relative to the chassis when the tractor runs on uneven ground surfaces. Thus, the tractor chassis is maintained horizontal or approximately horizontal regardless of such uneven ground surfaces.

Figure 3:
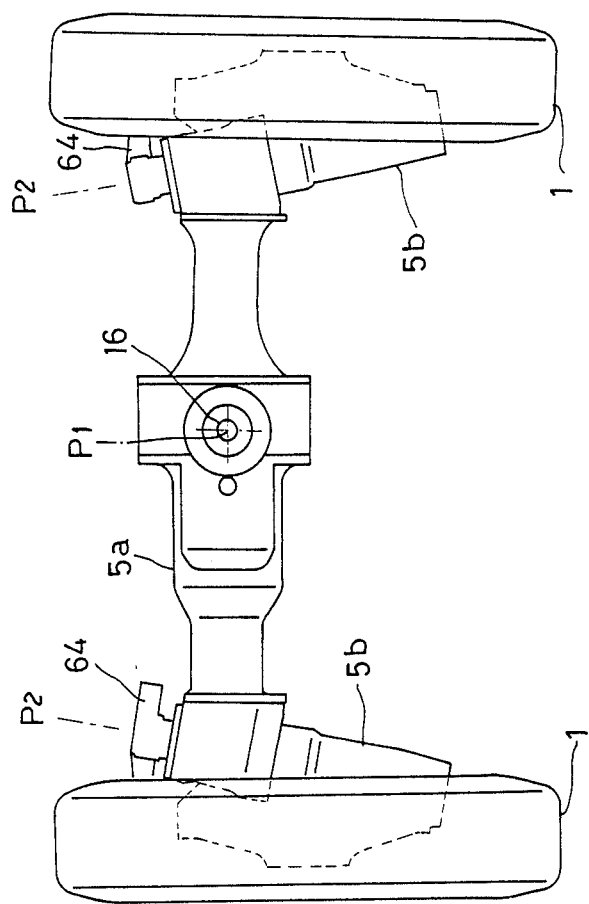
FIG. 3 is a rear view, partly broken away, of the four wheel drive tractor equipped with the front axle case of FIG. 2.

As shown in FIG. 3, the front axle case 5 consists of a center case portion 5a and a pair of vertical case portions 5b connected to opposite ends thereof. The vertical case portions 5b are pivotable on steering axes P2 slightly inclined from vertical lines. The front wheels 1 are dirigible by pivoting movements of the vertical case portions 5b on steering axes P2.

Figure 2:
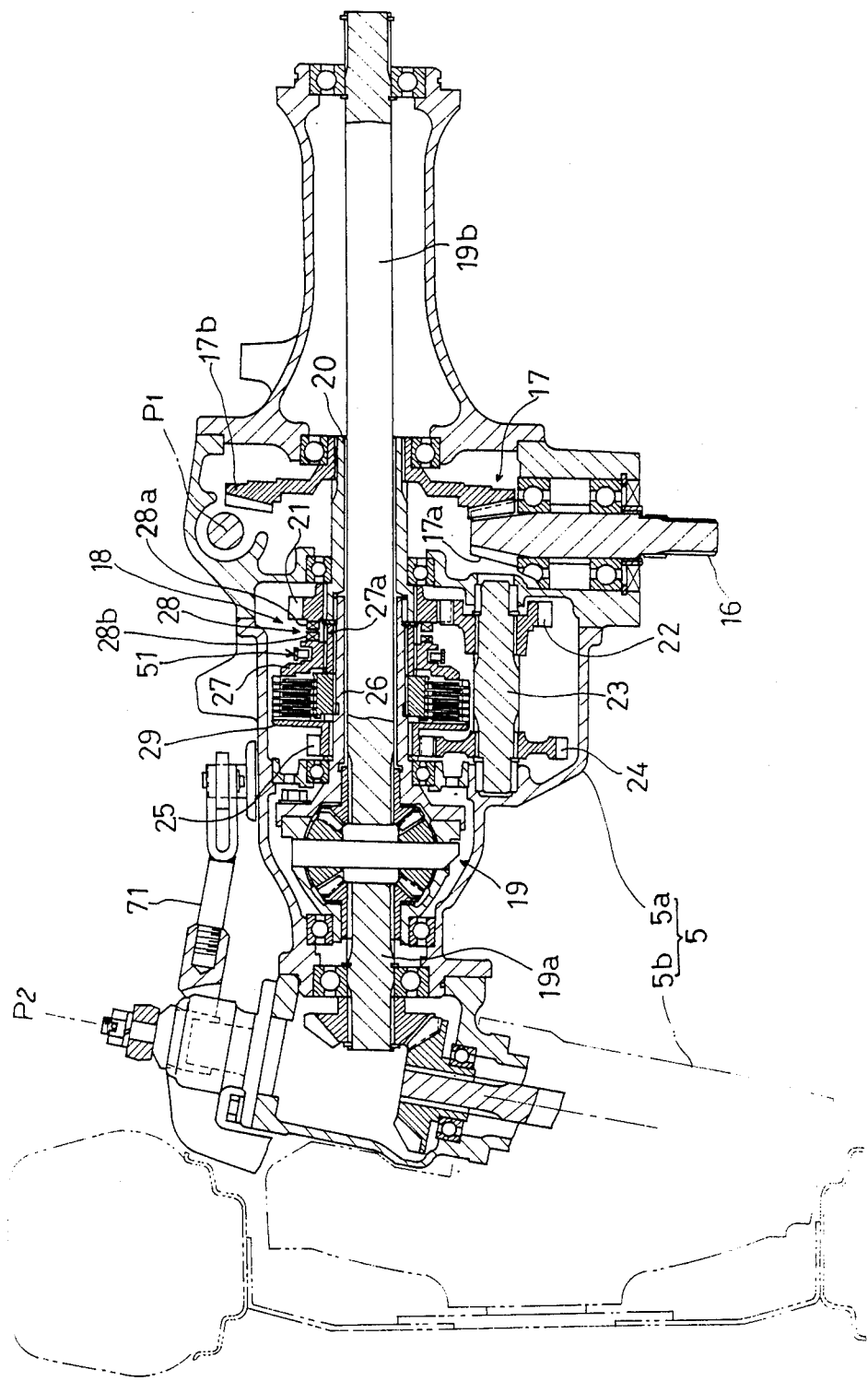
FIG. 2 is a sectional view of a front axle case according to one embodiment of the present invention with a transmission shaft portion shown as developed.

Reverting to FIG. 1, a propelling drive transmission 9 is housed in a transmission case 8 constituting a rear portion of the chassis. The propelling drive transmission 9 receives output of an engine 10 through a clutch 11 and an intermediate shaft 12. The propelling drive transmission 9 is operatively connected to the rear wheels 2 through a rear differential 13. Further, the propelling drive transmission 9 includes a front wheel drive output shaft 14 projecting forwardly from the transmission case 9. The front wheel drive output shaft 14 is connected through an intermediate shaft 15 to a transmission shaft 16 supported by the front axle case 5 and extending longitudinally of the tractor. As shown in FIG. 2, the transmission shaft 16 is connected through a bevel gear reduction mechanism 17 to a front wheel drive transmission 18 housed in the front axle case 5. The bevel gear reduction mechanism 17 comprises a small bevel gear 17a mounted on the transmission shaft 16 and a large bevel gear 17b mounted on an input sleeve shaft 20 constituting an input portion of the front wheel drive transmission 18. An output of the front wheel drive transmission 18 is transmitted to the right and left front wheels 1 through a front differential 19 and right and left axles 19b, 19a. The right axle 19b extends through the input sleeve shaft 20 and an output sleeve shaft 26. In FIG. 2, the transmission shaft 16 and its adjacent region is shown as developed about 90 degrees for expediency of illustration.

The above construction permits the engine output to be transmitted through the propelling drive transmission 9 to the rear wheels 2 and the front wheels 1.

The front wheel transmission 18 will now be described in greater detail with reference to FIG. 2. The input sleeve shaft 20 carries, in addition to the large bevel gear 17b, an input gear 21 mounted to be rotatable in unison with the input sleeve shaft 20. The input sleeve shaft 20 is coaxial with the output sleeve shaft 26 which is continuous with the front differential 19 and which carries a third gear 25 relatively rotatably mounted thereon. An intermediate shaft 23 is disposed parallel to the input sleeve shaft 20 and output sleeve shaft 26. The intermediate shaft 23 carries a first gear 22 meshed with the input gear 21 and a second gear 24 meshed with the third gear 25. The output sleeve shaft 26 further carries a tubular member 27a mounted to be rotatable in unison therewith. A slide member 27 is splined to the tubular member 27a to be slidable on the tubular member 27a and rotatable in unison therewith. A claw clutch 28 is provided between the input gear 21 and slide member 27, whereas a multidisk friction clutch 29 is provided between the third gear 25 and output sleeve shaft 26. The friction clutch 29 has an input portion formed integral with the third gear 25 and an output portion fixed to the output sleeve shaft 26. The claw clutch 28 includes claws 28a mounted on the input gear 21 and claws 28b mounted on the slide member 27. The slide member 27 includes a piston portion for acting on a disk of the friction clutch 29, whereby the friction clutch 29 is controllable by sliding movements of the slide member 27. The slide member 27 acts to selectively engage and disengage the claw clutch 28 and friction clutch 29. In other words, the slide member 27 selectively establishes a first transmission line by engaging the claw clutch 28 to directly connect the input sleeve shaft 20 to the output sleeve shaft 26 by way of the input gear 21, claw clutch 28 and slide member 27, and a second, accelerating transmission line by engaging the friction clutch 29 to connect the input sleeve shaft 20 to the output sleeve shaft 26 by way of the input gear 21, first gear 22, second gear 24, third gear 25 and friction clutch 29. The slide member 27 is controlled by a front transmission control device 30 in response to steering angles as particularly described later.

How the front wheel drive transmission 18 operates will be described next. When a front wheel steering angle is within a predetermined angle, the friction clutch 29 is disengaged and the claw clutch 28 is engaged whereby a torque of the input gear 21 is transmitted to the output sleeve shaft 26 through the slide member 27. In other words, the front wheel drive transmission 18 assumes a position for standard drive transmission or a first four wheel drive mode wherein the drive is transmitted to the front differential 19 through the first transmission line to substantially equalize an average peripheral speed of the right and left front wheels 1 to an average peripheral speed of the right and left rear wheels 2. When the front wheel steering angle exceeds the predetermined angle, the claw clutch 28 is disengaged and the friction clutch 29 is engaged whereby a torque of the third gear 25 is transmitted to the output sleeve shaft 26. In other words, the front wheel drive transmission 18 assumes a position for acceleration or a second four wheel drive mode wherein the drive is transmitted to the front differential 19 through the second transmission line to increase the average peripheral speed of the right and left front wheels 1 to be greater than the average peripheral speed of the right and left rear wheels 2.

The control device 30 for controlling the front wheel drive transmission 18 in response to the front wheel steering angle will be described next. This control device 30 derives its input from the front wheel steering angle and provides an output for controlling a shifter 51 engaging the slide member 27 to operate the claw clutch 28 and friction clutch 29.

Figure 4:
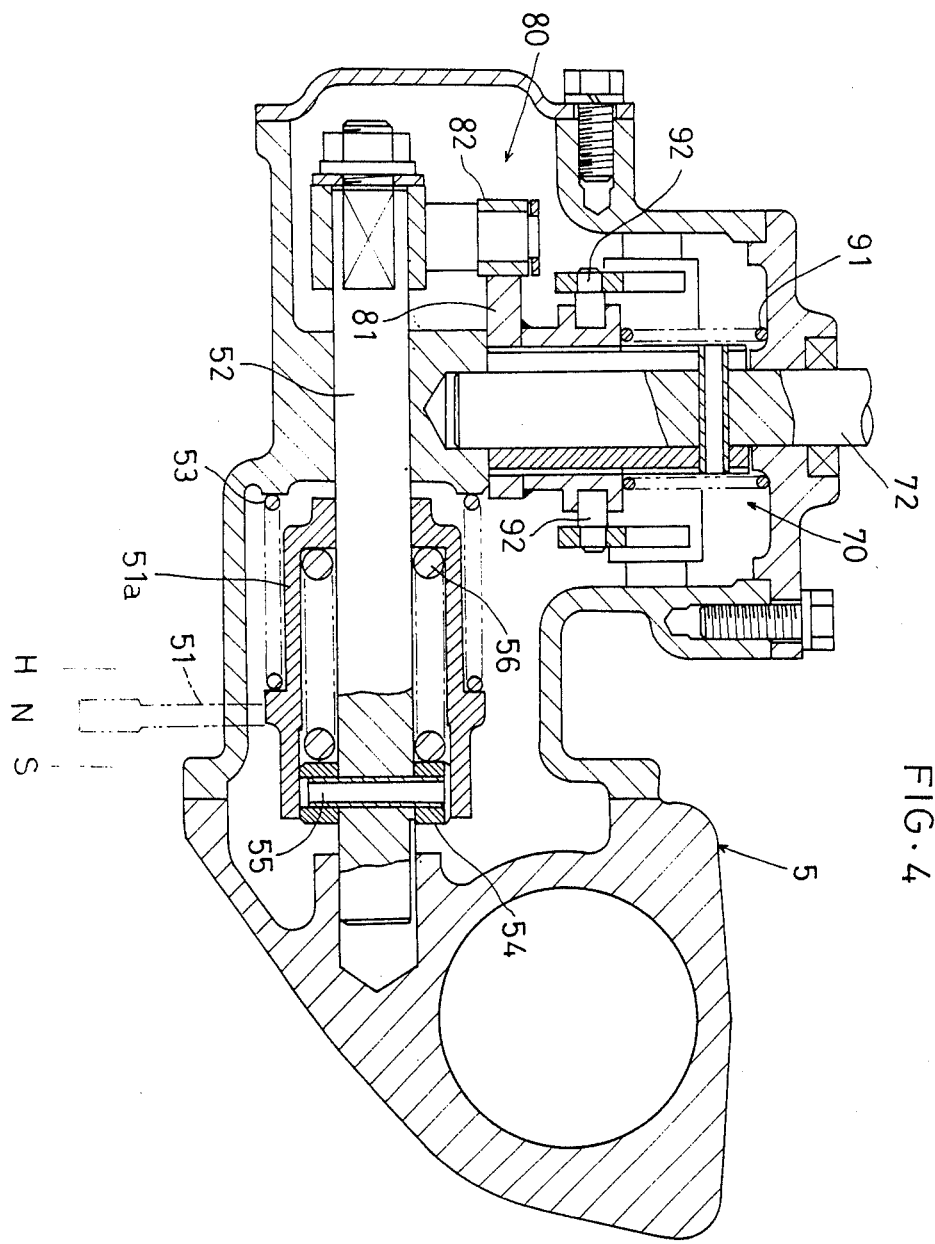
FIG. 4 is a sectional view, partly broken away, of an input portion of a control device for controlling a front wheel drive transmission.

As shown in FIG. 4, the shifter 51 for operating the claw clutch 28 and friction clutch 29 is mounted on a support shaft 52 supported by the front axle case 5, the shifter support shaft 52 being slidable relative to the shifter 51 and front axle case 5. The shifter 51 is biased by a spring 53 to a position on the shifter support shaft 52 to disengage the friction clutch 29. The shifter support shaft 52 carries a spring engaging member 54 fixed thereto by a pin 55 and inserted into one end of a boss portion 51a of the shifter 51 to be slidable relative to the shifter 51. A charge spring 56 is mounted in the boss portion 51a between the spring engaging member 54 and the other end of the boss portion 51a to impart a force for engaging the friction clutch 29. When the shifter support shaft 52 is caused by a cam mechanism, which will be described later, to slide against the biasing force of the spring 53, the charge spring 56 operates the shifter 51 to slide the slide member 27. Thus, the elements 51 to 56 constitute an output mechanism of the control device 30.

Figure 5:
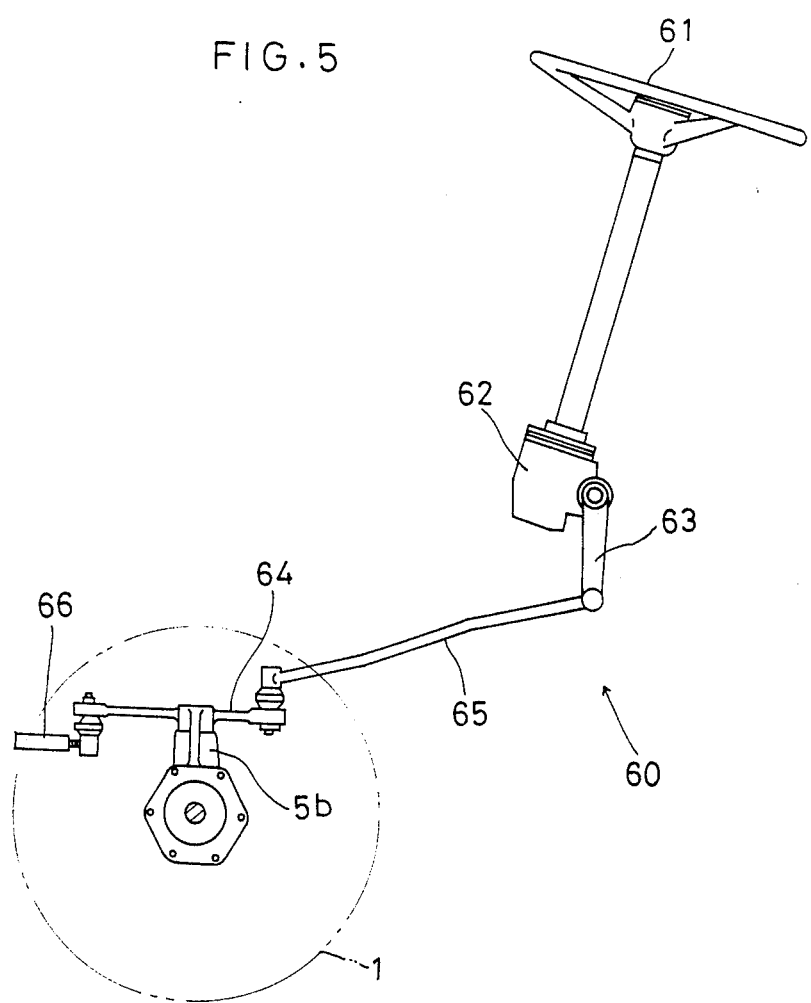
FIG. 5 is a schematic view showing an interlocking structure between a steering wheel and a knuckle arm.

FIG. 5 shows a front wheel steering mechanism. This mechanism comprises a steering wheel 61, a steering gear case 62, a pitman arm 63 projecting from the steering gear case 62, a link 65 operatively connecting the pitman arm 63 to one of the knuckle arms 64, and a tie rod operatively connecting the knuckle arms 64 to each other. With this construction, the front wheels 1 are steered by turning of the steering wheel 61. The front wheel steering mechanism acts also as input mechanism 60 for the control device 30.

Referring to FIGS. 4, 6, 7 and 8, the knuckle arm 64 is further connected to one end of an interlocking rod 71 which is operatively connected at the other end to a cam operating rotary shaft 72 projecting from the front axle case 5, the interlocking rod 71 being operatively connected to the rotary shaft 72 through an oscillatable arm 73 fixed to the rotary shaft 72. The rotary shaft 72 actuates the shifter support shaft 52 of the already described output mechanism 50 through a cam mechanism 80. The cam mechanism 80 comprises a rotary cam 81 splined onto the rotary shaft 72 and a cam follower pin 82 attached to the shifter support shaft 52. The interlocking rod 71, cam operating rotary shaft 72, oscillatable arm 73 and cam mechanism 80 are collectively referred to herein as interlocking mechanism 70.

The rotary cam 81 defines a first cam surface 81a, a second cam surface 81b and a third cam surface 81c. The first cam surface 81a is shaped such that a point of contact between the first cam surface 81a and the cam follower pin 82 approaches a rotational axis of the rotary cam 81 as the rotary shaft 72 rotates clockwise. The second cam surface 81b is shaped to maintain the distance between the point of contact and the rotational axis below a predetermined value (which is constant in the example of FIG. 6). The third cam surface 81c is shaped to increase this distance with the clockwise rotation of the rotary shaft 72. As seen, the second cam surface 81b is disposed between the first cam surface 81a and third cam surface 81c.

Figure 6:
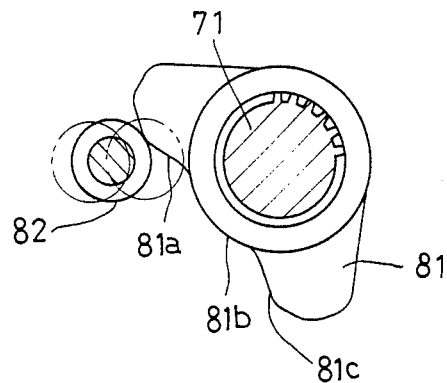
FIG. 6 is a schematic view showing operation of a cam mechanism.
Figure 8:
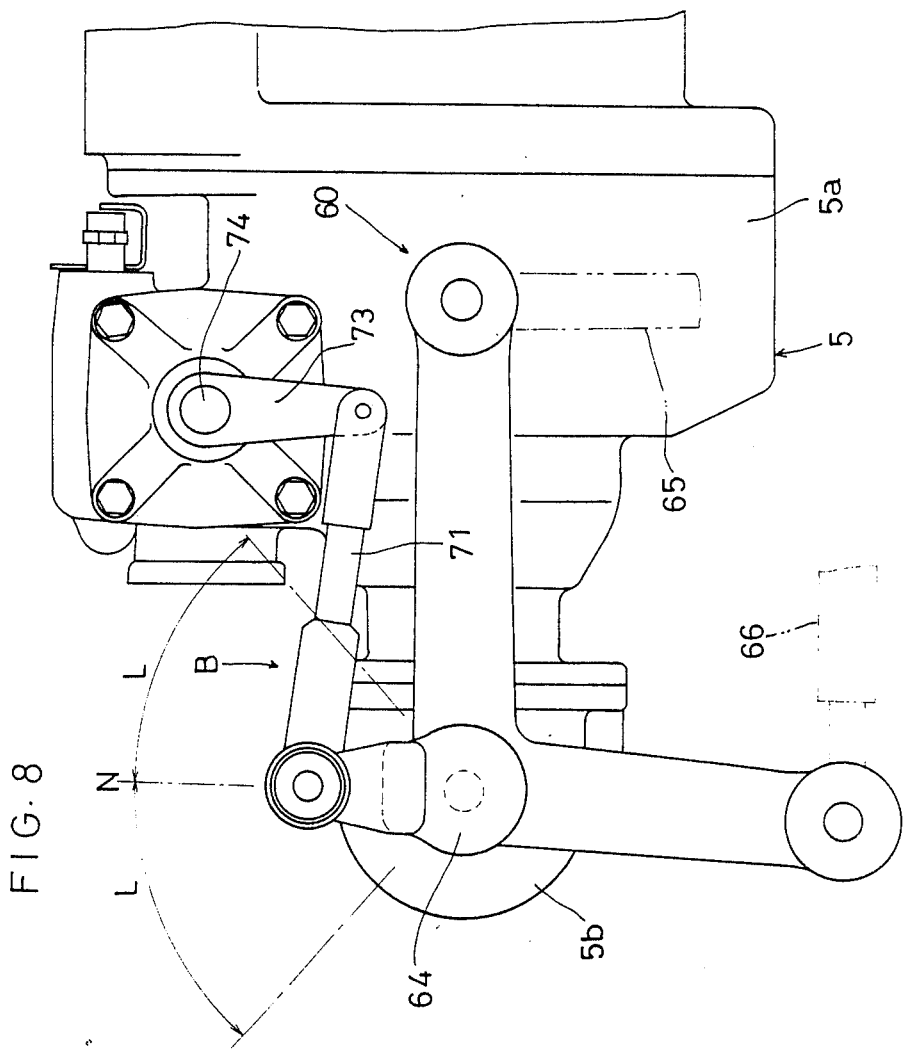
FIG. 8 is a plan view of a knuckle arm mounting structure.

The rotary cam 81, or the second cam surface 81b, does not act on the cam follower pin 82 when the knuckle arm 64 is within a predetermined right and left pivoting range L, L as shown in FIG. 8, this pivoting range including a neutral position N in the center which corresponds to a straight running position of the front wheels 1. At this time the shifter 51 is maintained in a first control position S by the biasing force of the spring 53 as shown in FIG. 4. When the knuckle arm 64 pivots right or left beyond the pivoting range L, L, the cam follower pin 82 moves away from the rotational axis of the rotary cam 81 through contact with the first cam surface 81a or third cam surface 81c as shown in FIG. 6. This causes the shifter support shaft 52 to slide and switch the shifter 51 past a neutral position N to a second control position H. In other words, the aforesaid input mechanism 60 is operatively connected to the front wheel drive transmission 18 to place the front wheel drive transmission 18 in the position for standard drive transmission with the cam follower pin 82 lying between the first cam surface 81a and third cam surface 81c when the steering angle of the front wheels 1 is within the predetermined angle, and to automatically switch the front wheel drive transmission 18 to the position for acceleration with the cam follower pin 82 moved by the first cam surface 81a or third cam surface 81c away from the rotational axis of the rotary cam 81 when the steering angle exceeds the predetermined angle.

Figure 7:
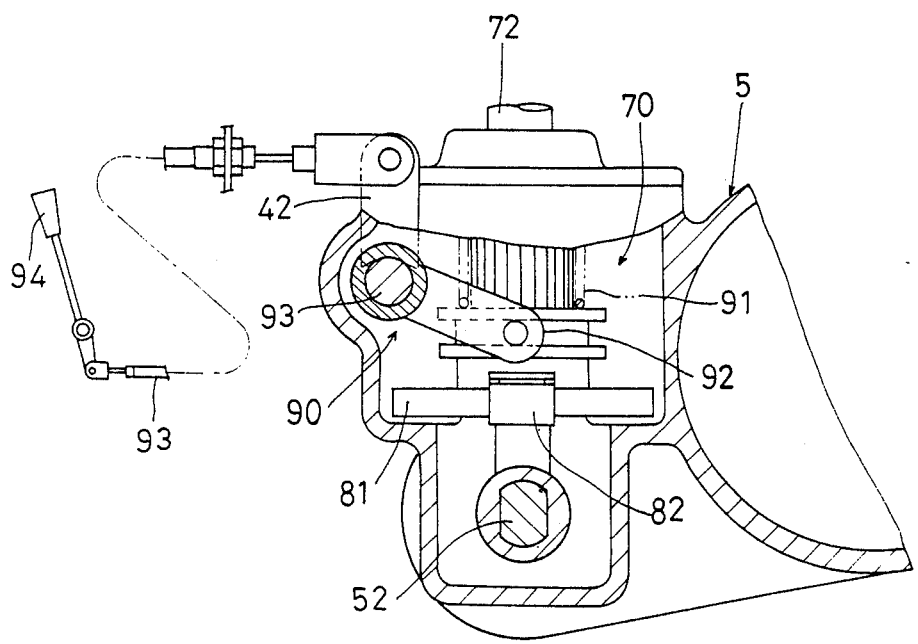
FIG. 7 is a sectional view, partly broken away, of a switch portion of the control device.

A switch mechanism 90 for switching the interlocking mechanism 70 between an operative position and an inoperative position will be described next with reference to FIGS. 4 and 7. The rotary cam 81 constituting the cam mechanism 80 is in spline connection to the cam operating rotary shaft 72 and therefore is slidable axially of the rotary shaft 72. A spring 91 is mounted on the rotary shaft 72 for biasing the rotary cam 81 to a position for engagement with the cam follower pin 82. The rotary cam 81 includes a boss defining a recess engaged by one end of a shift fork 92. The shift fork 92 is supported at an intermediate position thereof by a support rod 93 attached to the front axle case 5. The other end of the shift fork 92 is operatively connected to a hand lever 94 through a release wire 93. According to the above switch mechanism 90, the interlocking mechanism 70 is switchable to the inoperative position when the hand lever 94 is operated to cause the rotary cam 81 to slide away from the cam follower pin 82 against the biasing force of spring 91, and to the operative position when the hand lever 94 is operated to cause the rotary cam 81 to slide toward the cam follower pin 82.

As described above, the control device 30 comprises the input mechanism 60, interlocking mechanism 70, switch mechanism 90 and output mechanism 50.

Figure 9:
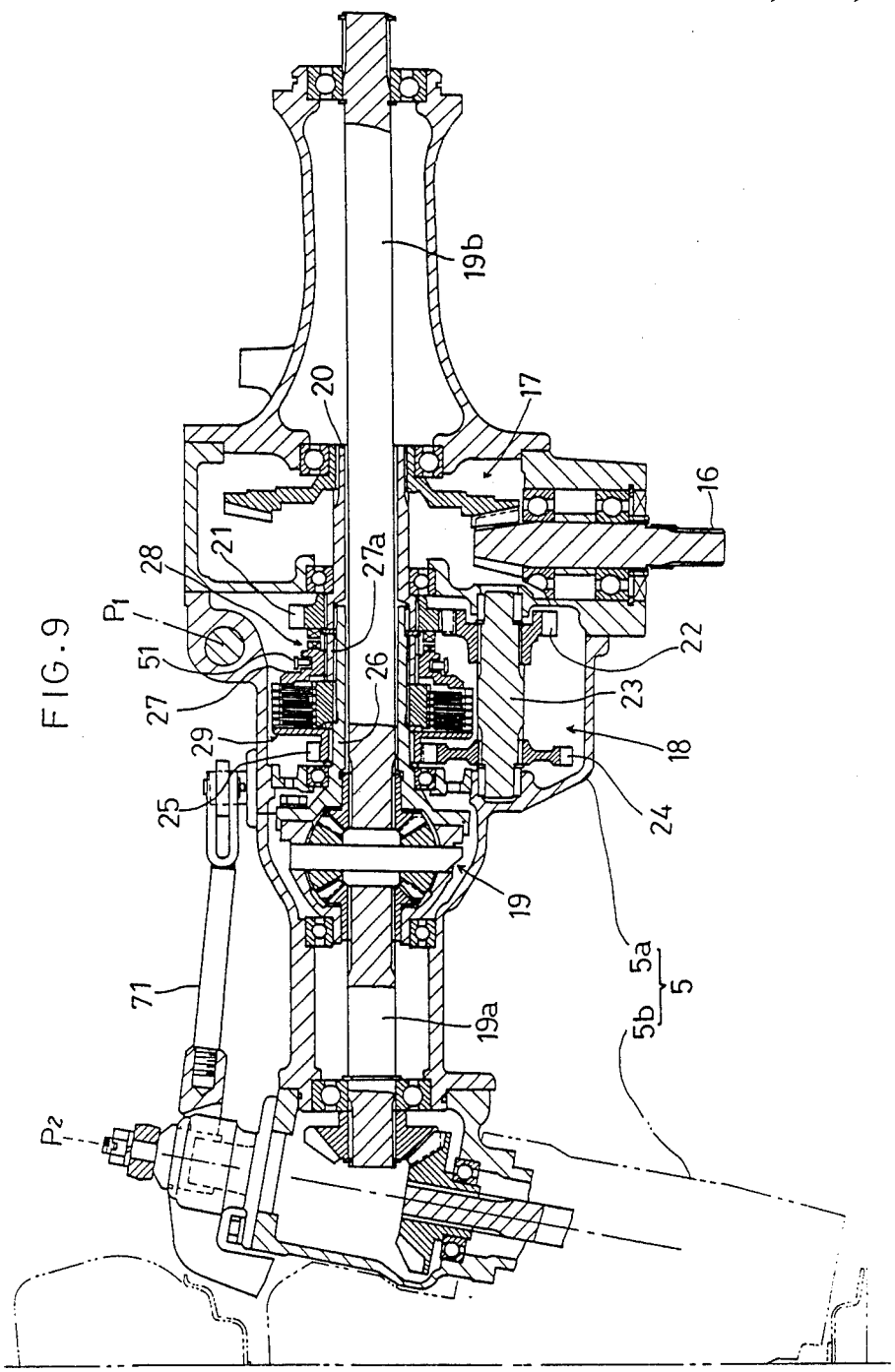
FIG. 9 is a sectional view of a front axle case according to another embodiment of the present invention with a transmission shaft portion shown as developed.
Figure 10:
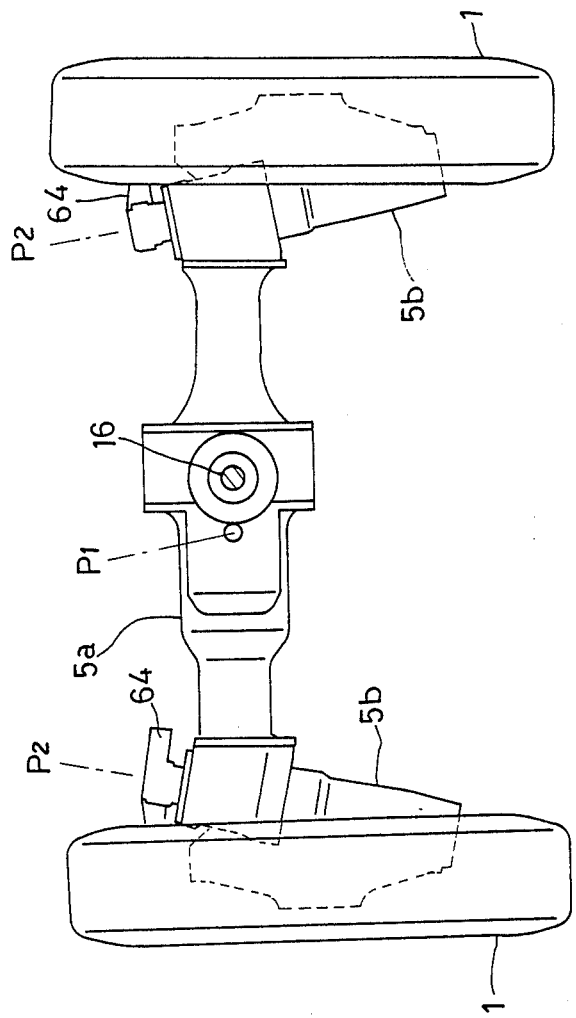
FIG. 10 is a rear view, partly broken away, of a four wheel drive tractor equipped with the front axle case of FIG. 9.

FIGS. 9 and 10 show a modified embodiment which differs from the foregoing embodiment only in respect of the position of pivotal axis P1 of the front axle case 5. In the modified embodiment the transmission shaft 16 and front differential 19 are distributed right and left across the axis P1 as viewed from the rear of the tractor. This construction permits a total weight of the transmission shaft 16, bevel gear mechanism 17, the front wheel drive transmission 18 and front differential 19 to fall substantially evenly on the right and left front wheels 1. Therefore, the transmission shaft 16 is displaced toward the right front wheel with respect to the axis P1, and its movement with the pivotal movement of front axle case 5 is allowed by flexion of a universal joint type flexing means mounted between the intermediate shaft 15 and transmission shaft 16.

Since the weight of the transmission shaft 16, bevel gear mechanism 17 attached to the transmission shaft 16, the front wheel drive transmission 18 and front differential 19 falls substantially evenly on the right and left front wheels 1, the front wheels 1 have substantially the same ground engaging load without a balancing weight. This construction equalizes the propelling action of right and left front wheels to assure safe running. It has a further advantage in that the tractor is lighter than when a balancing weight is employed.

Figure 11:
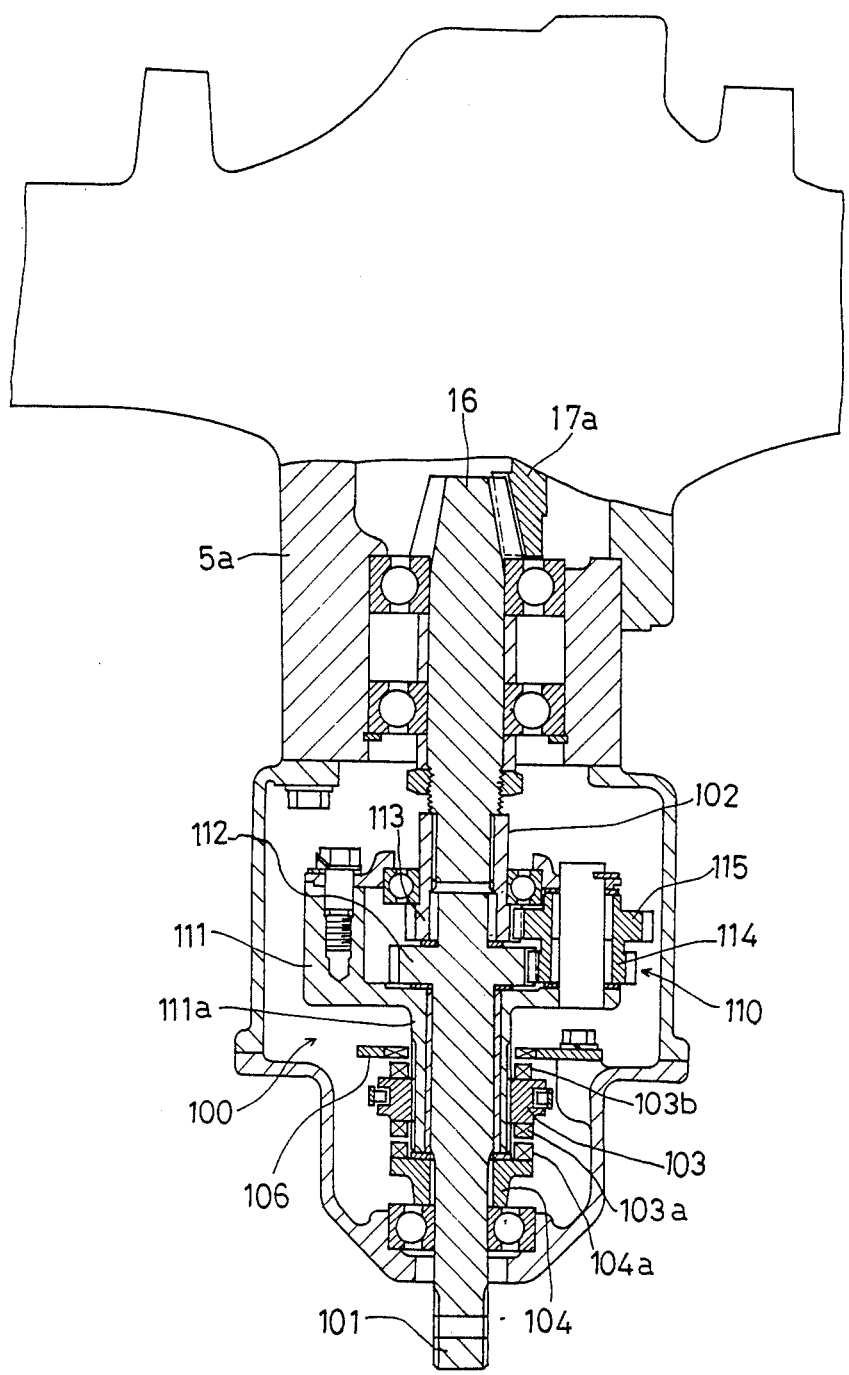
FIG. 11 is a sectional view of a front axle case according to a further embodiment of the present invention.

FIG. 11 shows a further embodiment which differs from the first embodiment in respect of the position of front wheel drive transmission. In this embodiment, the front wheel drive transmission 18 is attached to a rear end of the center case portion 5a of front axle case 5 constituting a front wheel drive transmission case, to transmit the drive torque from the propelling drive transmission 9 to the transmission shaft 16 without changing its speed or after increasing it. The front wheel drive transmission 18 includes a planetary gear accelerating mechanism 110 provided between an input shaft 101, which receives the drive from the intermediate shaft 15, and an output sleeve shaft 102. This accelerating mechanism 110 comprises a sun gear 112 mounted on the input shaft 101, an output gear 113 mounted on the output sleeve shaft 102, first and second planet gears 114, 115 meshed with the sun gear 112 and output gear 113, respectively and a carrier 111 rotatable around the input shaft 101.

A slide member 103 is splined to a tubular portion 111a of the carrier 111 carrying the planet gears, so that the slide member 103 is rotatable with the carrier 111. The slide member 103 defines first claws 103a at one end thereof and second claws 103b at the other end. The first claws 103a are engageable with claws 104a defined on a flange member 104 fixed to the input shaft 101. The second claws 103b are engageable with a stopper 106 fixed to a change speed case 105 housing the accelerating mechanism 110. When the first claws 103a of slide member 103 engage the claws 104a of flange member 104, the carrier 111 is operatively connected to the input shaft 101 to rotate in unison thereby establishing a standard drive transmission mode in which the torque of the input shaft 101 is transmitted to the output sleeve shaft 102 at an unchanged speed. When the second claws 103b engage the stopper 106, the carrier 111 is locked against rotation thereby establishing an accelerating mode in which the torque of the input shaft 101 is transmitted to the output sleeve shaft 102 at an increased speed. The drive from the output sleeve shaft 102 is transmitted through the bevel gear mechanism 17 to the front differential 19 for driving the front wheels. The slide member 103 of course is controlled by the described control device 30 in response to the steering angle.

The control device 30 has been described as being operable to automatically engage the claw clutch 28 or friction clutch 29 by means of the cam mechanism 80 operatively connected to the steering wheel 61. However, the clutches 28 and 29 may be arranged manually engageable by a switch or other means.

What is claimed is:

1. A four wheel drive vehicle comprising
a pair of dirigible front wheels (1 supported by front wheel support means (5),
a propelling drive transmission (9) disposed in a rear portion of the vehicle,
a pair of rear wheels (2) receiving a drive from said propelling drive transmission (9), and
a front wheel drive transmission (18) receiving a drive divided out from said propelling drive transmission (9),
said front wheel drive transmission (18) being switchable between a first four wheel drive mode in which an average peripheral speed of said pair of front wheels is substantially the same as an average peripheral speed of said pair of rear wheels, and a second four wheel drive mode in which the average peripheral speed of said pair of front wheels is greater than the average peripheral speed of said pair of rear wheels,
wherein said front wheel drive transmission (18) is mounted in said front wheel support means (5).

2. A four wheel drive vehicle as claimed in claim 1 wherein said front wheel support means (5) comprises a front axle case, said front axle case housing front axle means extending transversely of the vehicle and including a front differential (19), and a transmission shaft (16) extending longitudinally of the vehicle for transmitting the drive from said propelling drive transmission (9) to said front differential (19), said front wheel drive transmission (18) being mounted on said front axle means for transmitting the drive from said transmission shaft (16) to said front differential (19) in a selected drive mode.

3. A four wheel drive vehicle as claimed in claim 2 wherein said front wheel drive transmission (18) includes a first transmission gear mechanism for providing said first four wheel drive mode, a second transmission gear mechanism for providing said second four wheel drive mode, and clutch means for selectively connecting said front wheel drive transmission (18) and said second transmission gear mechanism to said front differential (19).

4. A four wheel drive vehicle as claimed in claim 2 wherein said front axle case is supported by the vehicle to be pivotable on a pivotal axis (P1) disposed at a midposition transversely of the vehicle and extending longitudinally of the vehicle, said pivotal axis (P1) and said transmission shaft (16) being substantially coaxial.

5. A four wheel drive vehicle as claimed in claim 2 wherein said front axle case is supported by the vehicle to be pivotable on a pivotal axis (P1) disposed at a midposition transversely of the vehicle and extending longitudinally of the vehicle, and wherein said front wheel drive transmission (18) is disposed at one lateral side of said pivotal axis (P1) and said transmission shaft (16) is disposed at the other side of said pivotal axis (P1), said transmission shaft (16) and said propelling drive transmission (9) being interposed by a universal joint.

6. A four wheel drive vehicle as claimed in claim 1 wherein said front wheel support means (5) comprises a front axle case, said front axle case housing front axle means extending transversely of the vehicle and including a front differential (19), and a transmission shaft (16) extending longitudinally of the vehicle for transmitting the drive from said propelling drive transmission (9) to said front differential (19), said front wheel drive transmission (18) being disposed upstream of said transmission shaft (16) for transmitting the drive from said propelling drive transmission (9) to said transmission shaft (16) in a selected drive mode.

7. A four wheel drive vehicle as claimed in claim 6 wherein said front wheel drive transmission (18) comprises an input shaft connected to said propelling drive transmission (9) and including a sun gear, an output shaft connected to said transmission shaft (16) and including an output gear, a carrier rotatable around said input shaft and carrying first and second planet gears in mesh with said sun gear and said output gear, respectively, and clutch means rotatable with said carrier and selectively engageable with said input shaft and with a stopper (42) fixed to said front axle case.

8. A four wheel drive vehicle as claimed in claim 1 wherein said front wheel drive transmission (18) is switchable by control means (30) operatively connected to front wheel steering means, to said first four wheel drive mode when a steering angle is below a predetermined value and to said second four wheel drive mode when the steering angle exceeds the predetermined value.

9. A four wheel drive vehicle as claimed in claim 8 wherein said control means (30) comprises an output mechanism including a charge spring, an input mechanism constituting said front wheel steering means, an interlocking mechanism connected to said input mechanism and connectable through a cam mechanism to said output mechanism, and a switch mechanism for establishing and breaking transmission between a cam and a cam follower of said cam mechanism.

* * * * *